Nov. 17, 1953           H. A. CHIVERS           2,659,465
CLUTCHING DEVICE FOR WINDSHIELD WIPERS

Filed July 22, 1948           2 Sheets-Sheet 1

INVENTOR
HENRY A. CHIVERS

Nov. 17, 1953  H. A. CHIVERS  2,659,465
CLUTCHING DEVICE FOR WINDSHIELD WIPERS
Filed July 22, 1948  2 Sheets-Sheet 2

INVENTOR
HENRY A. CHIVERS
By Young, Emery & Thompson
Attys.

Patented Nov. 17, 1953

2,659,465

UNITED STATES PATENT OFFICE 2,659,465

CLUTCHING DEVICE FOR WINDSHIELD WIPERS

Henry Albert Chivers, Balwyn, Victoria, Australia

Application July 22, 1948, Serial No. 40,033

Claims priority, application Australia August 7, 1947

3 Claims. (Cl. 192—3.2)

1

This invention relates to windscreen wipers for automobile vehicles and the like, and has for its general object to provide improved operating or driving means for such wipers whereby numerous practical advantages will be obtained, the more salient advantages being silent and positive operation, ability to obtain infinitely variable control of the speed of the wiper according to requirements, provision for preventing the wiper from operating at a higher speed than a predetermined maximum and simplicity of construction and arrangement of the operating means which have a minimum of working parts, none of which are liable to derangement.

According to the invention, I apply the principles of fluid drive in the operating means in a manner which enables the before-mentioned and various other desirable advantages to be obtained as will be readily appreciated from the following description and the accompanying drawings in which.

Figures 1, 2, 3:
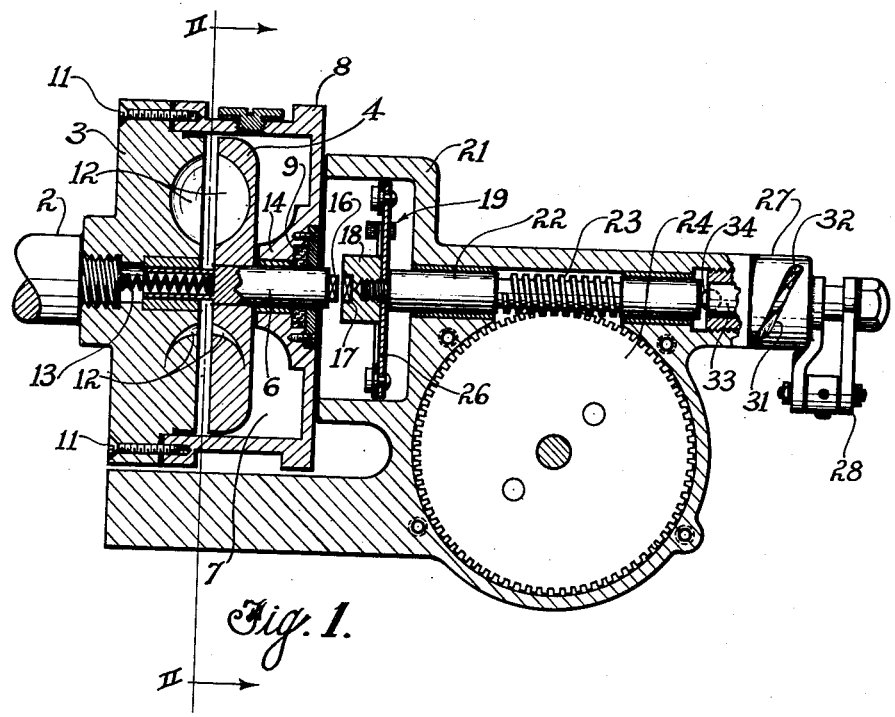
Figure 1 is a sectional elevation of one embodiment of the invention.
Figure 2 is a cross sectional view on line 11—11 of Figure 1.
Figure 3 is an end view of the right hand side of Figure 1.

Referring to Figures 1 to 3, I provide a driving shaft 2 adapted to be driven from the vehicle engine by any appropriate connections. A driving impeller 3 is fixed on this shaft, while a driven runner or turbine 4 is fixed upon a coaxial shaft 6, these two members 3 and 4 of a fluid coupling being disposed within a chamber 7 which is filled with oil or suitable hydraulic fluid. The chamber may be closed by a cover 8 through one end of which the driven shaft 6 projects through an oil seal 9, while the other end of the cover may be attached by screws 11 to a flange outstanding from the driving flywheel.

The inner or adjacent faces of the two flywheel members 3 and 4 are provided with suitable cups, pockets or recesses 12 spaced circumferentially and of any appropriate size and shape.

A spring 13 may be arranged so as to yieldingly urge the driven member 4 and its shaft 6 away from the driving impeller, such outward movement being limited by an appropriate limit stop 14.

The aforesaid projecting end of the driven runner shaft may have a dog clutch element 16 for engaging a companion element 17 on the hub 18 of a centrifugal governor 19 which is mounted in

2 a suitable casing 21 at one end of another coaxial shaft 22 provided with a worm 23 engaging a worm wheel 24 also supported in said casting.

The governor may be of any suitable type and construction, for example it may comprise a cross bar 26 having a pair of arms pivoted thereto at their inner ends and carrying friction pads at their outer ends to engage the inner periphery of casing 21 when the rotation of shaft 22 exceeds a predetermined rate. Springs may be associated with the arms so as to prevent the pads receding too far from the periphery of the casing.

A flexible drive member 26' (Figure 3) may lead from the worm wheel shaft to the linkage for actuating the wiper arms.

In order to start, stop and exercise variable speed control over the operating mechanism, a sleeve 27 may be mounted with ability to turn in relation to the worm spindle 22 at one end thereof, this sleeve being operated by an arm 28 connected by a flexible control cable 29 to a suitable position on the vehicle. The sleeve is provided with a circumferentially inclined slot 31 to accommodate a pin 32 outstanding from a spindle 33 so that by turning the sleeve in one direction, a ball 34 projecting at one end of the spindle engages the adjacent end of the worm shaft 22 and moves it lengthwise so that the dog clutch 16, 17 will be engaged and, by continued movement, will bring the working face of the driven turbine 4 into closer proximity with the working face of the driving impeller 3, overcoming the influence of spring 13.

Thus it will be apparent that when the dog clutch 16, 17 is disengaged, the wiper will be out of action. By engagement of the dog clutch, the worm shaft 22 is connected to the driven flywheel and, subject to the extent of lengthwise movement of the worm shaft, the driven runner will be moved towards the driving impeller so that the speed of rotation of the worm shaft and consequently the speed of operation of the wipers will be increased until there is a predetermined minimum gap between the adjacent faces of the impeller and turbine members, whereupon maximum speed will be obtained.

The governor device 19 can be set to come into operation automatically in order to prevent the wipers being operated beyond a predetermined maximum wiping speed.

It will be appreciated that the foregoing construction and arrangement will achieve the objects and advantages as before stated herein.

A further advantage is that sudden bursts of acceleration in engine speed will be automatically compensated by slipping of the fluid turbine drive.

Figure 4:
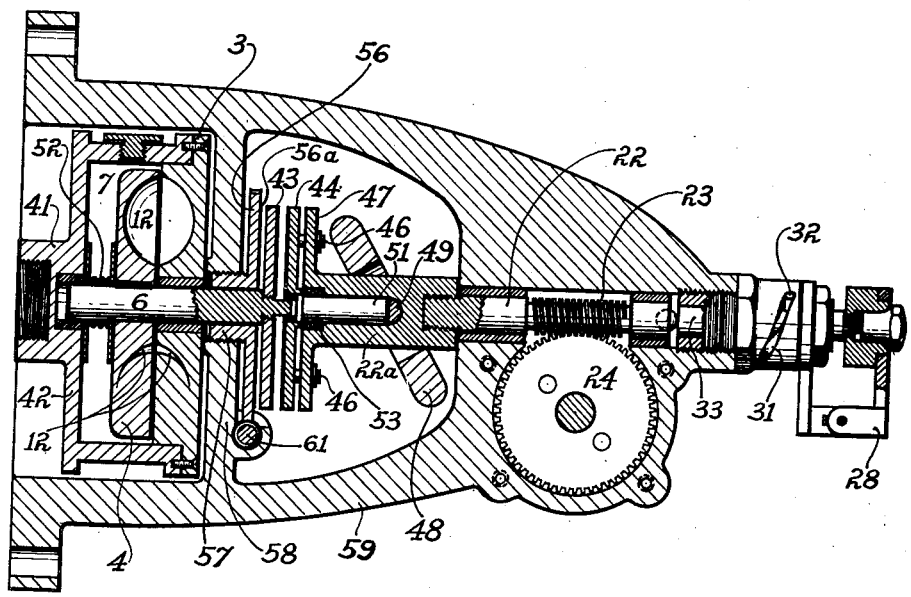
Figure 4 is a sectional elevation showing a preferred practical form of the invention.

The same principles are utilized in the embodiment of Figure 4 which may be taken to represent a typical commercial design. In this case the main driving shaft may be screwed into a hub 41 of a cap member 42 secured to the driving impeller 3 and forming, with the latter, chamber 7 which encloses the driven runner 4, the latter being fast upon shaft 6 around which the driving wheel is rotatable. This embodiment dispenses with a dog clutch but employs a plate clutch, the driving plate 43 being fast on shaft 6 while the driven plate 44 is rotatable about the adjacent end of shaft 6 and supported with ability for axial movement by pins 46 extending through holes in a flange 47 of an extension 22a of worm shaft 22.

A centrifugal governor may comprise a ring member 48 encircling part 22a and pivotally retained thereto by a cross bar 49 which is of half-circular shape in cross section, at least where it extends within the semi-circular end of a bore or passage in the part 22a. The cross bar pivot may thus act as a cam to the extent that as the ring 48 swings toward a position perpendicular to part 22a, due to centrifugal force, member 49 turns in its passage and applies lengthwise pressure to a rod 51 which is slidable in the bore of part 22a.

A spring 52 may encircle shaft 6 between cap 42 and the driven runner 4 to prevent the latter from receding too far from the driving impeller 3. Another spring 53 may encircle rod 51 between a shoulder on part 22a and the driven plate 44 of the clutch.

An adjustable stabilizer or damping device is preferably associated with the driving plate of the clutch and such device may take the form of a disc 56 having a screwed hub 57 for screwing into an aperture in a partition wall 58 of a main casing or housing 59. The periphery of the disc 56 may be toothed so as to mesh with an adjusting screw 61 the head of which is accessible from the exterior of the casing. Thus by manipulating this screw the working face of the disc which may carry a layer of friction material 56a may be brought into variable pressure contact with the adjacent face of driving plate 43.

The other parts of Figure 4 not specifically mentioned may be assumed to be the same as or equivalents for the parts illustrated in Figures 1 to 3 and are denoted by similar reference numerals.

The operational characteristics of the embodiment of Figure 4 are substantially the same as those of Figures 1 to 3. Thus to initiate operation worm shaft 22 is moved endwise to the left in order to engage the plates of the clutch. The worm shaft is thereby operatively connected to the driven flywheel 4 so that the wiper will be actuated at a speed depending primarily upon the extent of the gap between the driving and driven flywheels. As the speed of rotation increases, the governor ring 48 swings towards a perpendicular position thus imparting endwise movement through cam 49 to rod 51 which causes the entire clutch device and shaft 6 with its driven runner 4 to be moved in the same direction so that the gap between a turbine and an impeller member is increased.

It will thus be apparent that such an arrangement permits of positive operation of the wiper at relatively low engine speeds and constant wiping action at relatively high engine speeds, as the driven runner is moved away from the driving impeller as engine speed increases but is permitted to closely approach the driving impeller at low engine speeds.

It will also be apparent that the stabilizer or damping device 56 prevents excessive speed of operation of the wipers and that such device may be conveniently set so as to exercise its control function at any given speed of rotation.

Having now described my invention, what I claim as new and desire to secure by Letters Patent is:

1. Apparatus for operating a windscreen wiper, comprising a fluid coupling device having a driving impeller, means connecting said impeller to a source of power, said coupling device having a driven runner operatively associated with said driving impeller so as to provide a gap between the runner and impeller, means for adjusting the gap between the runner and impeller while the apparatus is in operation in order to vary the speed of rotation of the driven runner, and a device operatively associated with the runner for restraining excessive speed of operation of the apparatus and comprising a stationary member provided with a cylindrical surface and a centrifugal governor having pivoted arms terminating in pads adapted to engage said surface.

2. Apparatus for operating a windscreen wiper, comprising a fluid coupling device having a driving impeller, a shaft on which said impeller is secured, said coupling device having a driven runner operatively associated with said driving impeller so as to provide a gap between the runner and impeller, a second shaft upon which said driven runner is secured extending in axial alignment with said first mentioned shaft, clutch elements for operatively interconnecting the second shaft with a driven shaft, and means for imparting lengthwise movement to said driven shaft in order to engage and disengage the clutch elements and for imparting lengthwise movement to said second shaft in order to vary the gap between said impeller and runner while the clutch elements are interengaged.

3. Apparatus according to claim 2, and including a centrifugal governor mounted upon said driven shaft and means actuated by said governor, upon the speed of rotation exceeding a given rate, to impart lengthwise movement to the said second shaft, without disengaging the clutch elements, in order to increase the gap between the runner and impeller.

HENRY ALBERT CHIVERS.

References Cited in the file of this patent

UNITED STATES PATENTS

| Number | Name | Date |
| --- | --- | --- |
| 1,672,232 | Saives | June 5, 1928 |
| 1,959,349 | Dodge | May 22, 1934 |
| 2,093,236 | Dodge | Sept. 14, 1937 |
| 2,129,366 | Swennes | Sept. 6, 1938 |
| 2,318,187 | Addison, Jr. | May 4, 1943 |
| 2,336,167 | Dillon | Dec. 7, 1943 |
| 2,395,047 | Hanson | Feb. 19, 1946 |

FOREIGN PATENTS

| Number | Country | Date |
| --- | --- | --- |
| 251,900 | Great Britain | May 13, 1926 |